(12) United States Patent
Huang et al.

(10) Patent No.: US 11,333,295 B2
(45) Date of Patent: *May 17, 2022

(54) TILT STAND

(71) Applicant: SYNCMOLD ENTERPRISE CORP., New Taipei (TW)

(72) Inventors: Chun-Hao Huang, New Taipei (TW); Chien-Cheng Yeh, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 58 days.

This patent is subject to a terminal disclaimer.

(21) Appl. No.: 16/934,367

(22) Filed: Jul. 21, 2020

(65) Prior Publication Data

US 2021/0048139 A1    Feb. 18, 2021

Related U.S. Application Data

(60) Provisional application No. 62/887,326, filed on Aug. 15, 2019.

(51) Int. Cl.
*F16M 11/10* (2006.01)
*G06F 1/16* (2006.01)

(52) U.S. Cl.
CPC .......... *F16M 11/10* (2013.01); *G06F 1/1601* (2013.01); *F16M 2200/041* (2013.01)

(58) Field of Classification Search
CPC . F16M 11/10; F16M 2200/041; G06F 1/1601
See application file for complete search history.

(56) References Cited

U.S. PATENT DOCUMENTS

| | | | | |
|---|---|---|---|---|
| 7,333,322 B2* | 2/2008 | Hwang | ............... | F16M 11/38 |
| | | | | 361/679.27 |
| 8,998,161 B2* | 4/2015 | Larson | ............... | B60R 11/02 |
| | | | | 248/441.1 |
| 9,038,972 B2* | 5/2015 | Fu | ............... | F16M 11/10 |
| | | | | 248/133 |
| 10,190,724 B2* | 1/2019 | Yen | ............... | F16M 11/10 |
| 10,495,252 B2* | 12/2019 | Lee | ............... | F16M 11/048 |
| 11,067,215 B2* | 7/2021 | Lee | ............... | F16M 11/105 |
| 2014/0145052 A1* | 5/2014 | Ho | ............... | F16M 11/2021 |
| | | | | 248/299.1 |
| 2017/0146181 A1* | 5/2017 | Chen | ............... | F16C 11/04 |
| 2020/0191323 A1* | 6/2020 | Huang | ............... | F16M 11/10 |
| 2020/0292123 A1* | 9/2020 | Huang | ............... | F16M 11/041 |

* cited by examiner

*Primary Examiner* — Bradley Duckworth
(74) *Attorney, Agent, or Firm* — Muncy, Geissler, Olds & Lowe, PC

(57) ABSTRACT

The present invention relates to a tilt stand for bearing a display device. The tilt stand comprises a seat body, a shaft, a tilting frame, and an elastic module. When an external force is applied to the display device to adjust a tilt angle, the tilting frame rotates about the shaft, a positional relationship of the curved surface and the elastic plate is changed, and a deformation amount and a balance torque are changed. When the external force is removed, the tilting frame is stopped at once at a position between the first position and the second position.

12 Claims, 19 Drawing Sheets

TILT STAND

CROSS REFERENCE TO RELATED APPLICATION

This application claims the benefit of U.S. Provisional Application Ser. No. 62/887,326 filed on Aug. 15, 2019. The entirety of the application is incorporated herein by reference.

BACKGROUND OF THE INVENTION

1. Field of the Invention

The present invention relates to a tilt stand. More particularly, the present invention relates to a tilt stand that provides partial support for a display device by a leaf spring.

2. Description of Related Art

Conventionally, a hinge used for bearing a display device has a torsion spring and a pivot shaft. When the tilt angle of the display device changes, the torsion spring is distorted with load and provides a rebounding torque against a downward torque generated by the weight of the display device. In the manner, the display device can be kept at a view angle.

However, such types of hinges adopting the torsion spring have some disadvantages. Since the torsion spring itself is large and needs to be set on the pivot shaft of the hinge that is disposed behind the display device, it is necessary to possess a sufficient configuration space between the display device and an upright for the accommodation and thus the hinge is unfavorable for structural simplification. It is also difficult to manufacture and operate such types of hinges since the parts and structures thereof are too complicated, which may increase manufacturing costs and be less attractive to consumers.

SUMMARY OF THE INVENTION

One of the main objects of the present invention is to provide a tilt stand that adopts an elastic plate to replace the conventional torsion spring. The tilt stand can not only achieve the similar effect as the conventional hinge, but also provides a better user experience. Since the torsion spring is absent in the present invention, the whole structure of the tilt stand has been designed to be simplified, light and slim. Moreover, a distance between the display device and the upright can be shortened. Therefore, when the display device carried by the tilt stand is rotated, a space required for the rotation will be smaller, and as a result, spaces can be used more efficiently.

To achieve the object above, the invention provides a tilt stand for bearing a display device. The tilt stand comprises a seat body, a shaft, a tilting frame, and an elastic module. The shaft is penetrated through the seat body along an axis. The tilting frame is connected to the display device, rotatably disposed on the shaft, and adapted to tilt between a first position and a second position. The elastic module has a curved surface and at least one elastic plate, the elastic plate has an inflexible section and a flexible section connected to the inflexible section, wherein the inflexible section is fixed, and the flexible section abuts against the curved surface so that the elastic plate has a deformation amount for providing a balance torque to the curved surface. When an external force is applied to the display device to adjust a tilt angle, the tilting frame rotates about the shaft, a positional relationship of the curved surface and the elastic plate is changed, and the deformation amount and the balance torque are changed. When the external force is removed, the tilting frame is stopped at once at a position between the first position and the second position.

The display device constantly provides a main torque to the shaft, and a direction of the balance torque is opposite to a direction of the main torque so that the balance torque is able to countervail the main torque. When the display device and the tilting frame rotate from the first position to the second position, the main torque and the balance torque gradually increase, and when the display device and the tilting frame rotate from the second position to the first position, the main torque and the balance torque gradually decrease.

The curved surface has a first abutting part and a second abutting part, and a distance between the first abutting part and the axis is smaller than a distance between the second abutting part and the axis. The elastic plate abuts against the first abutting part of the curved surface when the tilting frame is at the first position, and the elastic plate abuts against the second abutting part of the curved surface when the tilting frame is at the second position.

In an embodiment, the elastic module further has a cam having the curved surface formed thereon, and the cam is sleeved on the shaft and connected to the tilting frame. The inflexible section of the elastic plate is fixed on the seat body. Moreover, the tilt stand further comprises an adjustment module, which is disposed on the seat body and movably presses against different positions of the elastic plate to change a length of the flexible section of the elastic plate.

The adjustment module comprises a screw rod, a screw seat, and a pressing block. The screw seat and the pressing block are fixed to each other, and are movably sleeved on the seat body. The screw rod is screwed to the screw seat, and wherein the screw rod is rotatably disposed on the seat body but is not able to linearly move relative to the seat body.

An extension direction of the screw rod is parallel to an extension direction of the inflexible section, and when the screw rod rotates on the seat body, the screw seat and the pressing block move relative to the seat body.

In another embodiment, the elastic module further has a board element. The board element is able to synchronously rotate with the tilting frame about the axis. The curved surface is formed on the board element, and the inflexible section of the elastic plate is disposed on the seat body.

The seat body has an extending portion for the elastic plate to be disposed.

The extending portion has a slot, and the inflexible section of the elastic plate is disposed in the slot.

In another embodiment, the elastic module further has a cam having the curved surface formed thereon, and the cam is sleeved on the shaft. In the embodiment, the shaft is fixed on the seat body, and the inflexible section of the elastic plate is fixed on the tilting frame.

In these embodiments where the cam is included in the elastic module, the cam is an eccentric cylinder and has a through hole for the shaft to pass through.

The tilting frame has a bearing plate for connecting the display device.

The elastic plate is a leaf spring and has a thickness between 2 millimeters to 10 millimeters.

DETAILED DESCRIPTION OF THE PREFERRED EMBODIMENT

The advantages and effects will be better understood from the following description. It should be noted that the following diagrams are simplified schematic diagrams. The number, shape, and size of components shown in the diagrams can be arbitrarily changed according to the actual practices, and the component layout can be even more complicated. The invention may also be implemented or applied through other embodiments, and the details in the specification may also be modified and changed based on different views and applications without departing from the spirit of the invention.

Figure 1:
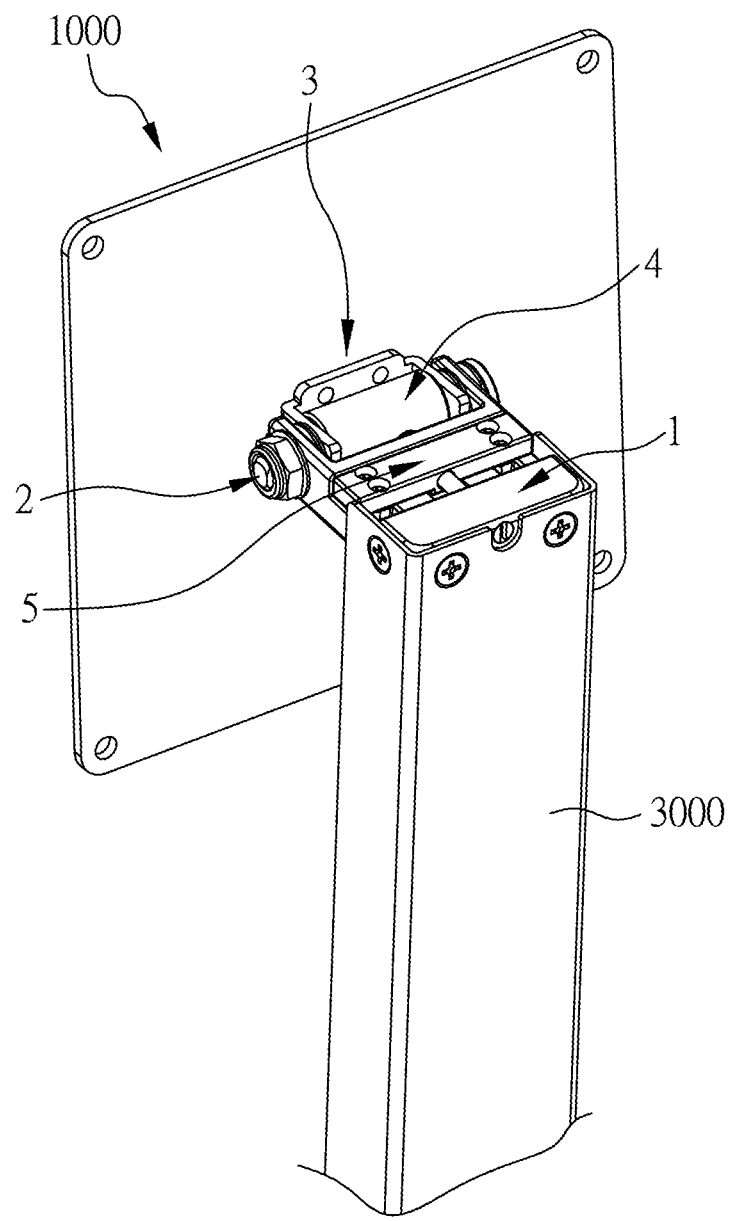
FIG. 1 is a schematic perspective view of a tilt stand connected to an upright according to the first embodiment of the present invention.
Figure 2:
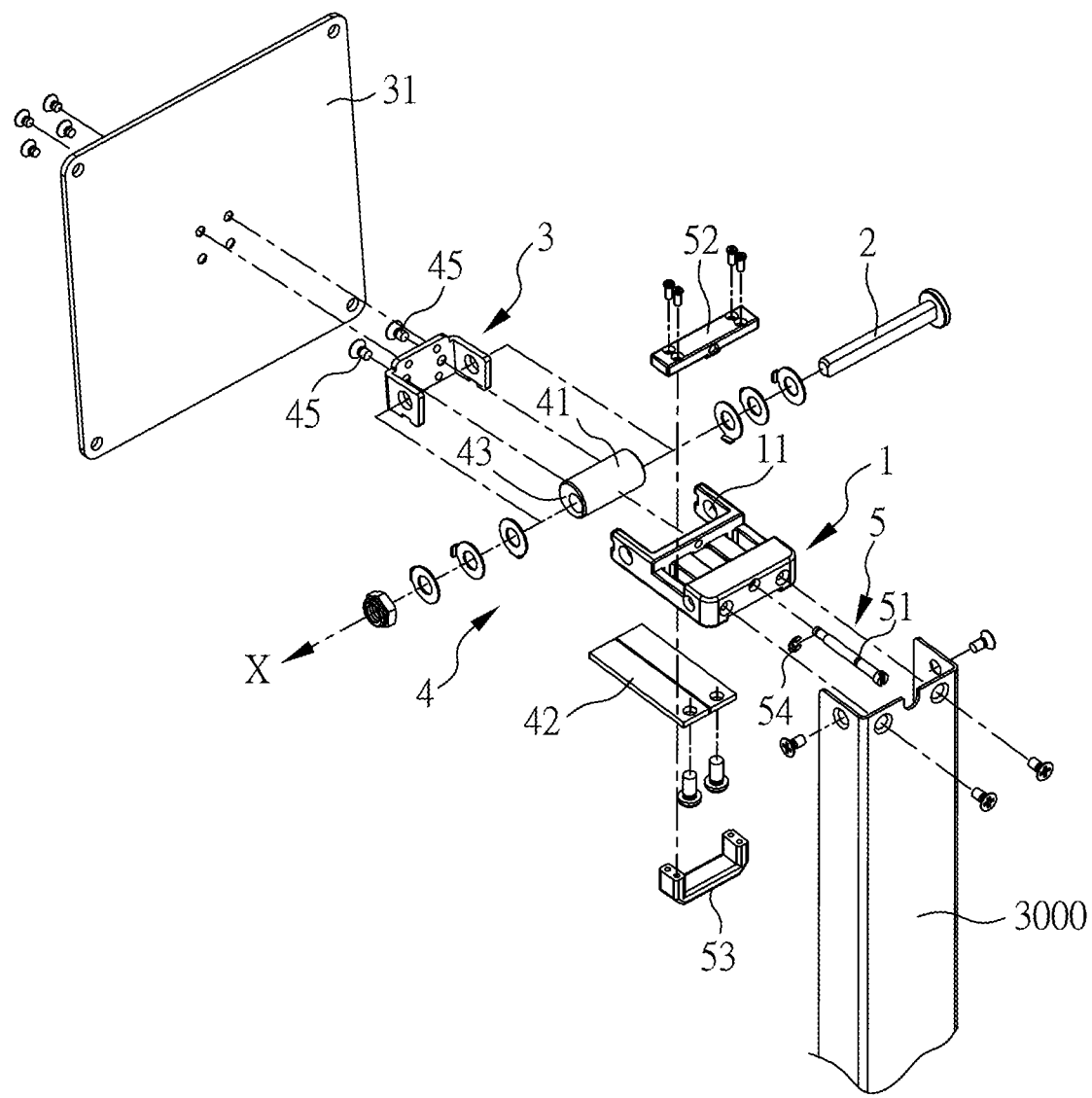
FIG. 2 is an exploded view of a tilt stand according to the first embodiment of the present invention.

FIGS. 1 and 2 are a perspective view and an exploded view of a tilt stand 1000 according to the first embodiment of the present invention, respectively. The tilt stand 1000 is used for bearing a display device 2000 (see FIGS. 5 and 6) and comprises a seat body 1, a shaft 2, a tilting frame 3, an elastic module 4, and an adjustment module 5.

Figure 3:
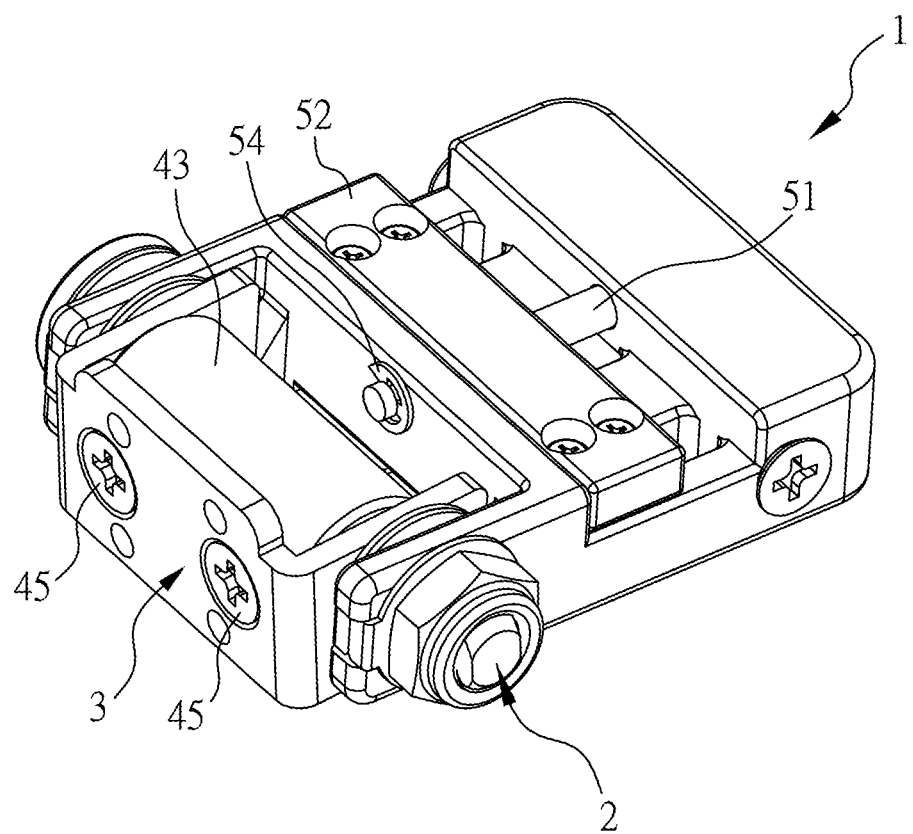
FIG. 3 is a partial perspective view of a tilt stand according to the first embodiment of the present invention.
Figure 4:
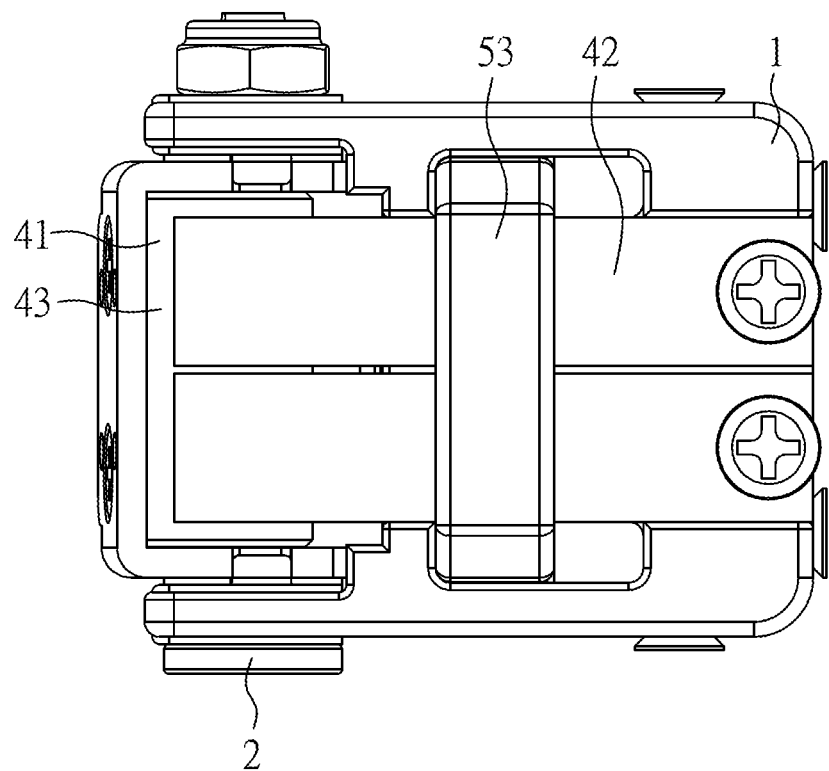
FIG. 4 is another partial perspective view of a tilt stand according to the first embodiment of the present invention.

Further referring to FIGS. 3 and 4, the seat body 1 has two axial bores 11 for the shaft 2 to penetrate through and rotatably connected to the tilting frame 3. The seat body 1 is also provided for the elastic module 4 and the adjustment module 5 to be disposed thereon. In the embodiment, the seat body 1 is fixed on an upright 3000 so that the display device 2000 can rotate relative to the upright 3000. However, in other embodiments, the seat body 1 can also be disposed on a supporting stand, a supporting arm, a working surface, or a wall, without limitation.

The shaft 2 penetrates through and is disposed on the seat body 1 along an axis X to pivotally connect the seat body 1 and the tilting frame 3. Washers are disposed between the seat body 1, the shaft 2, and the tilting frame 3 to prevent excessive wearing therebetween.

Figure 5:
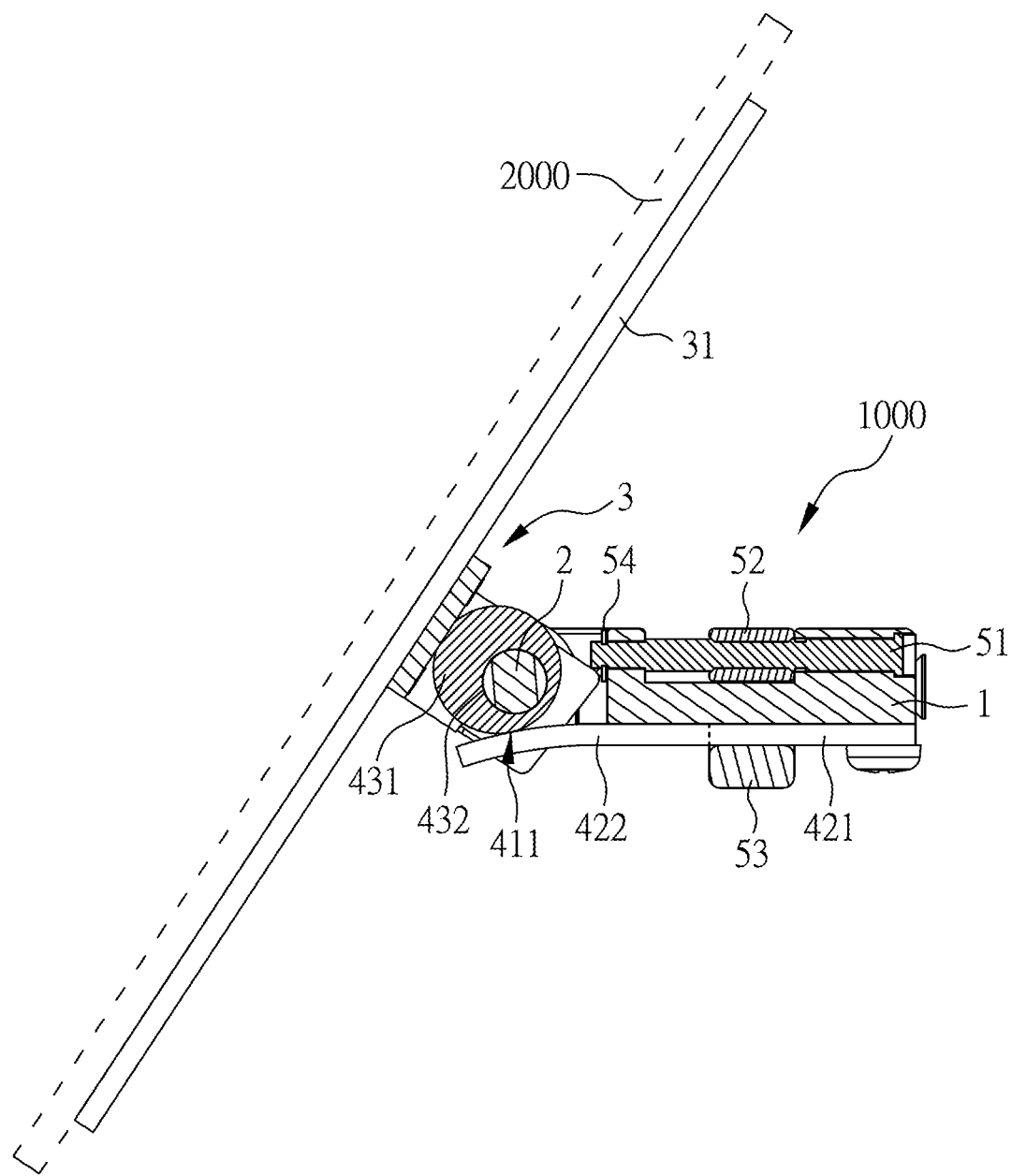
FIG. 5 is a cross-sectional view of a tilt stand in the first position according to the first embodiment of the present invention.
Figure 6:
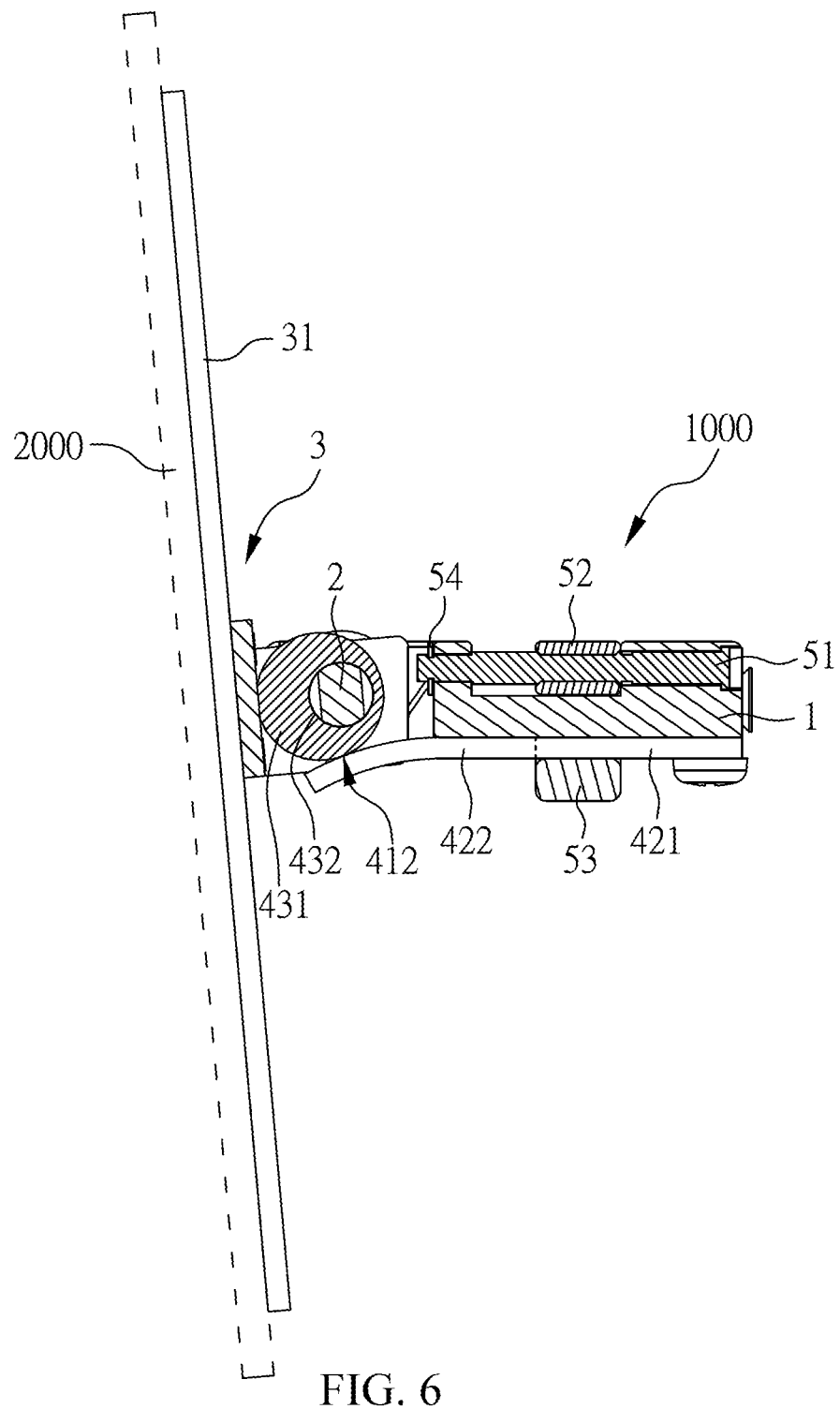
FIG. 6 is a cross-sectional view of a tilt stand in the second position according to the first embodiment of the present invention.

The tilting frame 3 pivotally disposed on the shaft 2 is connected to the display device 2000 and adapted to tilt between a first position (see FIG. 5) and a second position (see FIG. 6). Specifically, when the tilting frame 3 is in the first position, the display device 2000 will tilt up, and when the tilting frame 3 is in the second position, the display device 2000 will slightly tilt down. The tilting frame 3 has a bearing plate 31 for connecting the display device 2000.

The elastic module 4 has a curved surface 41, two elastic plates 42, a cam 43, and two fastening elements 45. The curved surface 41 has a first abutting part 411 and a second abutting part 412, wherein a distance between the first abutting part 411 and the axis X is smaller than a distance between the second abutting part 412 and the axis X. The elastic plates 42 abut against the first abutting part 411 of the curved surface 41 when the tilting frame 3 is at the first position, and the elastic plates 42 abut against the second abutting part 412 of the curved surface 41 when the tilting frame 3 is at the second position.

Furthermore, each of the elastic plates 42 has an inflexible section 421 and a flexible section 422, wherein the inflexible section 421 and the flexible section 422 are connected, the inflexible section 421 is fixed on the seat body 1, while the flexible section 422 abuts against the curved surface 41. Thus, each of the elastic plates 42 has a deformation amount and the elastic plates provide a balance torque to the curved surface 41. Each of the elastic plates 42 is a leaf spring and has a thickness between 2-10 millimeters.

In the embodiment, the curved surface 41 is formed on the cam 43, while the cam 43 is sleeved on the shaft 2 and is connected to the tilting frame 3 through the fastening elements 45. In detail, the fastening elements 45 are screws, which are penetrated through the tilting frame 3 and fixed to the cam 43 so that the tilting frame 3 and the cam 43 can rotate synchronously about the shaft 2. The cam 43 is an eccentric cylinder and has a main part 431 and a through hole 432 for the shaft to pass through, and wherein the through hole 432 is formed on the main part 431. And thus, the cam 43 abuts against the elastic plates 42 with a varying degree as the tilt angle of the tilting frame 3 changes.

Figure 7:
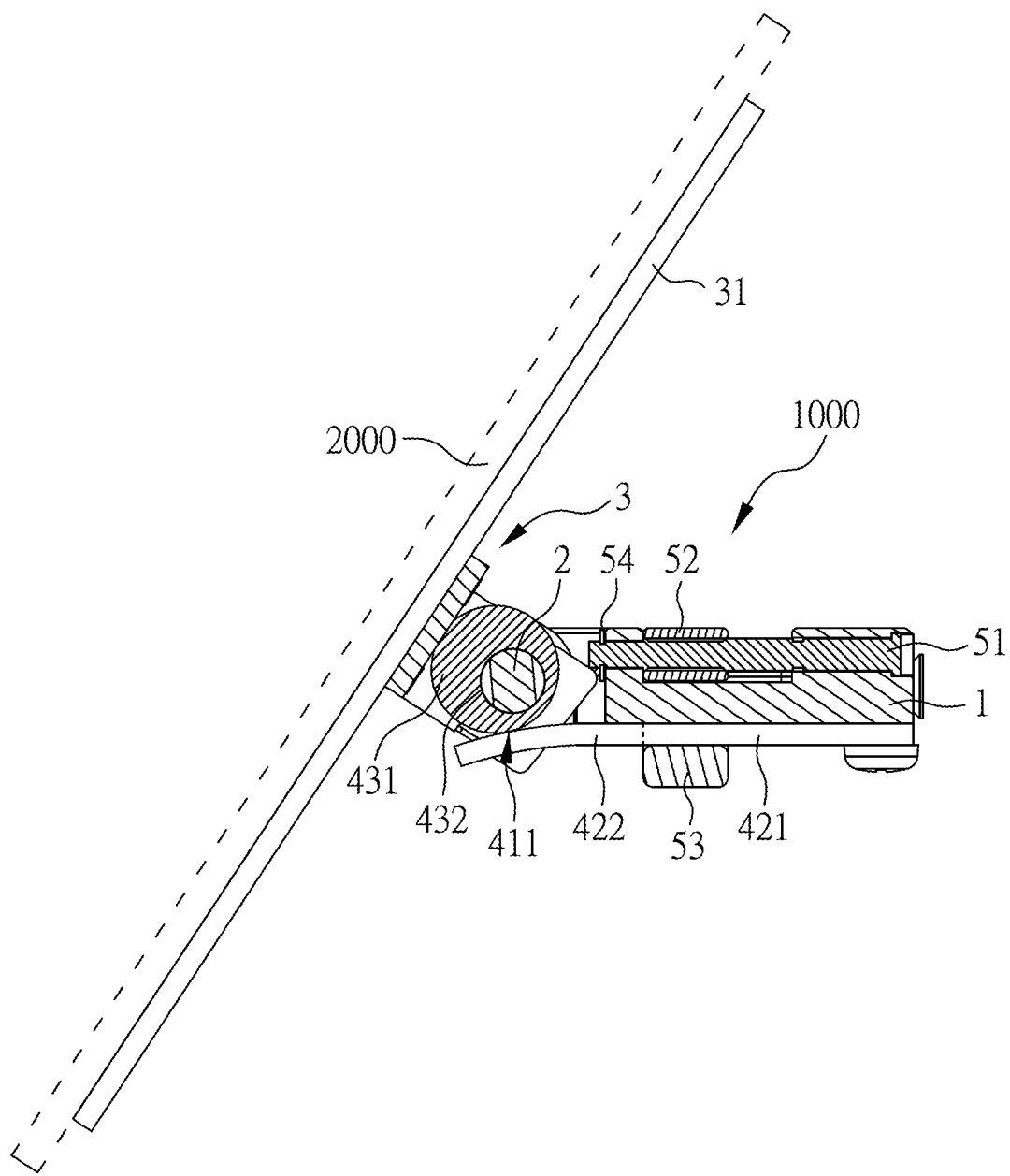
FIG. 7 is a cross-sectional view showing a shorter flexible section of a tilt stand according to the first embodiment of the present invention.

Referring to FIGS. 5, 6, and 7, the adjustment module 5 is disposed on the seat body 1 and movably presses against different positions of the elastic plates 42, and thus, lengths of the flexible sections 422 of the elastic plates 42 can be changed. Specifically, since the inflexible sections 421 and the flexible sections 422 are correspondingly connected as a whole, lengths of the inflexible sections 421 will be shortened while lengths of the flexible sections 422 are elongated, and the lengths of the inflexible sections 421 will be elongated while the lengths of the flexible sections 422 are shortened.

The adjustment module 5 comprises a screw rod 51, a screw seat 52, a pressing block 53, and a retaining ring 54. The screw seat 52 and the pressing block 53 are fixed to each other and are movably sleeved on the seat body 1. The screw rod 51 is rotatably disposed on the seat body 1 and screwed to the screw seat 52. Since the retaining ring 54 is held at the end of the screw rod 51 to limit displacements of the screw rod 51, the screw rod 51 can only rotate relative to the seat body 1 without linear movement relative to the seat body 1. Moreover, an extension direction of the screw rod 51 is parallel to an extension direction of the inflexible sections 421. When the screw rod 51 pivots on the seat body 1, the screw seat 52 and the pressing block 53 move relative to the seat body 1, and the pressing block 53 moves to different positions on the elastic plates 42 while pressing the elastic plates 42 to determine lengths of the inflexible sections 421 and the flexible sections 422 of the elastic plates 42, respectively. Specifically, as the lengths of the flexible sections 422 of the elastic plates 42 become longer, an elastic force of the elastic plates 42 against the cam 43 will become smaller; conversely, as the lengths of the flexible sections 422 of the elastic plates 42 become shorter, the elastic force of the elastic plates 42 against the cam 43 will become greater. Therefore, when the tilting frame 3 is at the same location, the deformation amounts of the elastic plates 42 can be changed by adjusting the adjustment module 5, and the balance torque generated by the elastic plates 42 will be changed correspondingly. Hence, the tilt stand 1000 can bear the display device 2000 having different weights.

The actuating relationship between the components in the first embodiment of the invention will be described as followed. The display device 2000 constantly provides a main torque relative to the shaft 2, and a direction of the balance torque is opposite to a direction of the main torque so that the balance torque is able to countervail the main torque. Therefore, when the display device 2000 and the tilting frame 3 rotate from the first position to the second position, the main torque and the deformation amounts of the flexible sections 422 gradually increase so that the balance torque also gradually increases. On the contrary, when the display device 2000 and the tilting frame 3 rotate from the second position to the first position, the main torque and the deformation amounts of the flexible sections 422 gradually decrease so that the balance torque also gradually decreases.

When an external force is applied to the display device 2000 to adjust a tilt angle, the tilting frame 3 and the cam 43 rotate synchronously about the axis X, a positional relationship of the curved surface 41 and the elastic plates 42 is changed, and the deformation amounts of the elastic plates 42 and the balance torque are changed as the tilting frame 3 rotates. Considering the friction between these components, the equilibrium can be reached substantially, and thus, when the external force is removed, the tilting frame 3 is stopped at once at a position between the first position and the second position.

Figure 8:
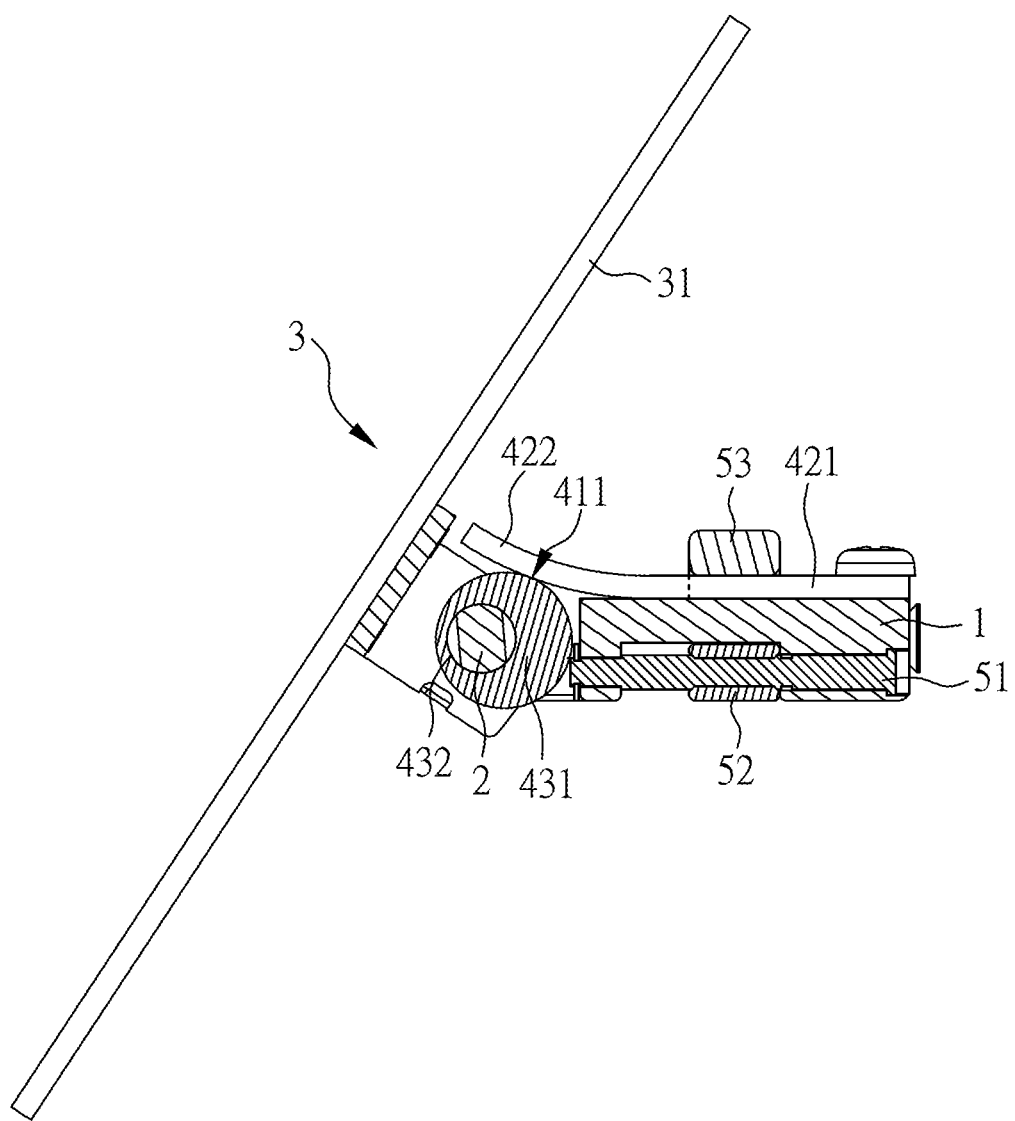
FIG. 8 is a cross-sectional view of a tilt stand according to the second embodiment of the present invention.
Figure 9:
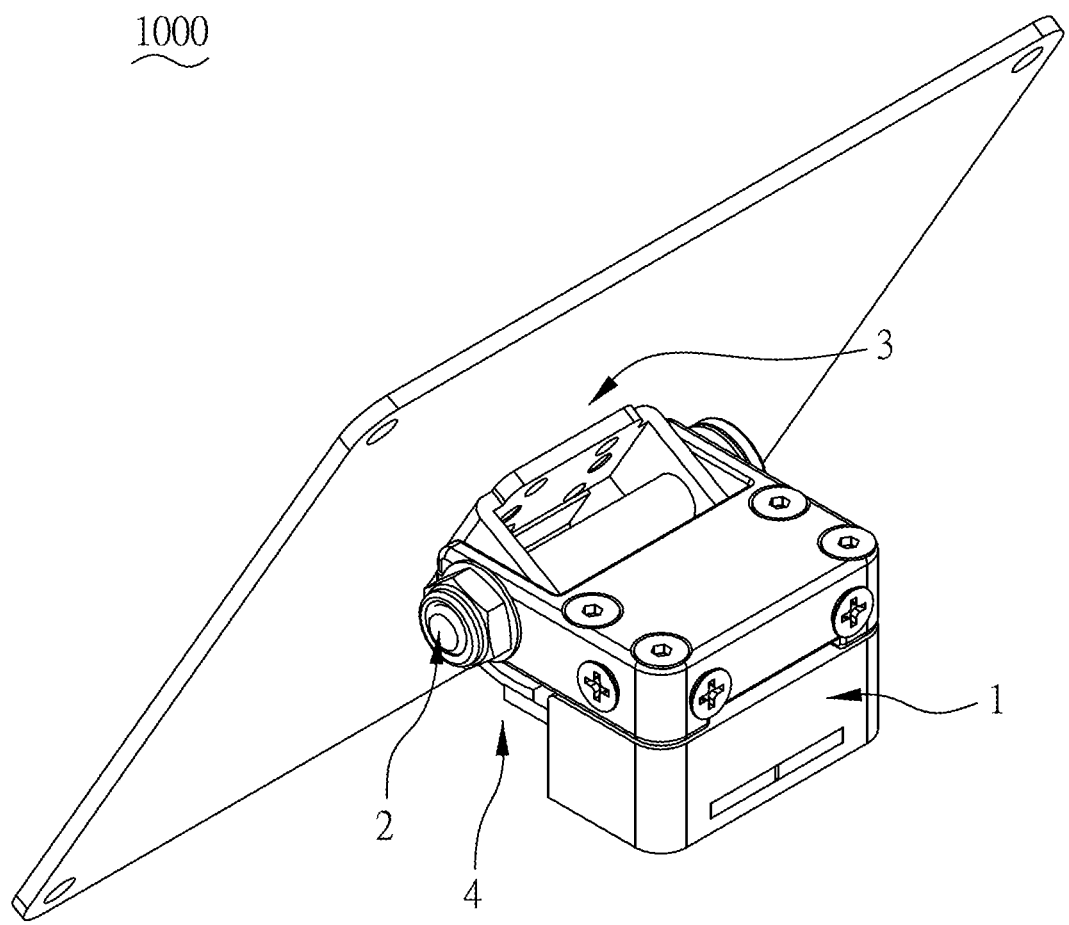
FIG. 9 is a schematic perspective view of a tilt stand according to the third embodiment of the present invention.
Figure 10:
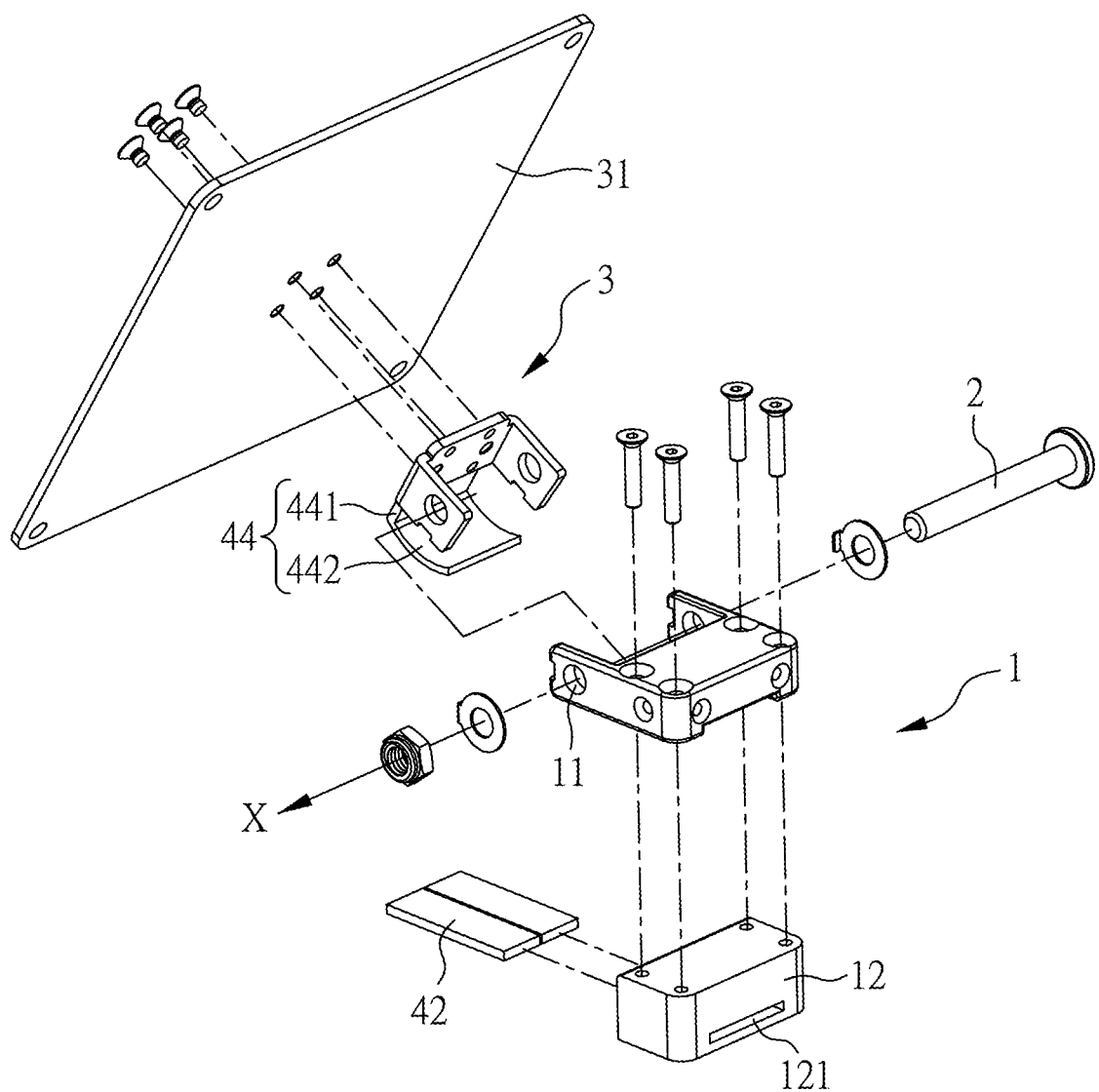
FIG. 10 is an exploded view of a tilt stand according to the third embodiment of the present invention.
Figure 11:
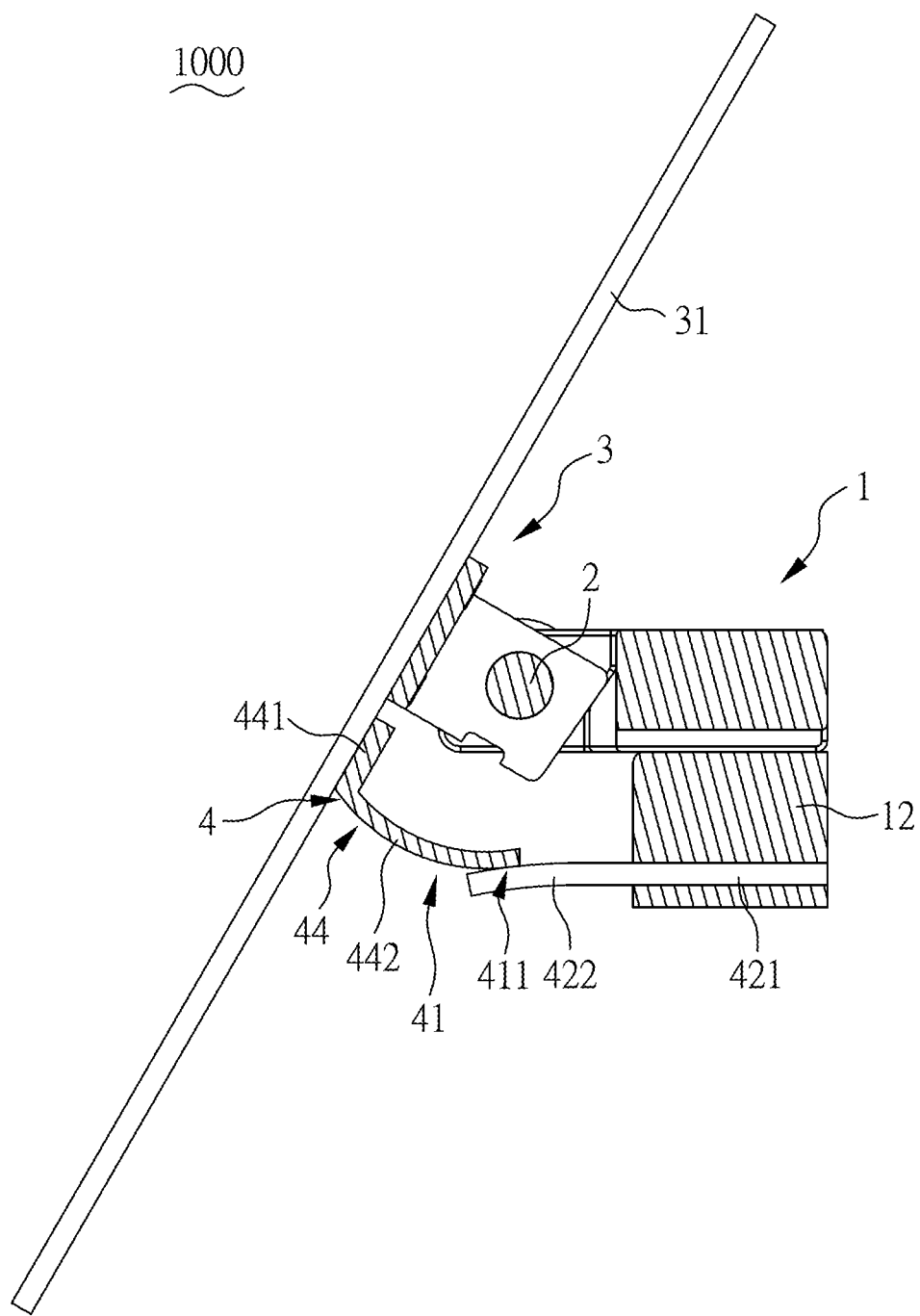
FIG. 11 is a cross-sectional view of a tilt stand in the first position according to the third embodiment of the present invention.
Figure 12:
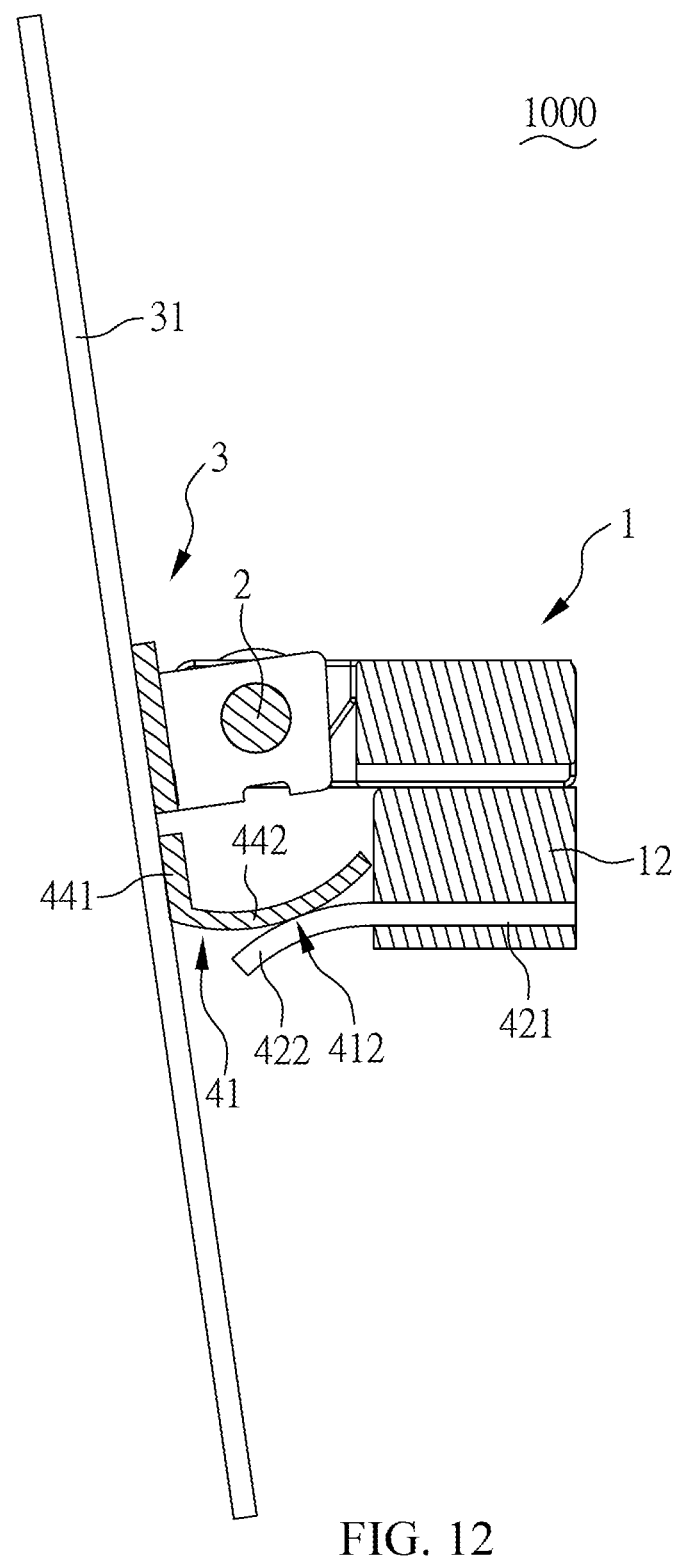
FIG. 12 is a cross-sectional view of a tilt stand in the second position according to the third embodiment of the present invention.

FIG. 8 shows a tilt stand 1000 according to the second embodiment of the present invention. The embodiment differs from the first embodiment described above in the positions of the elastic plates 42, which can be designed according to actual needs. In detail, in the embodiment, the elastic plates 42 are disposed on the upper portion of the seat body 1, and the curved surface 41 on the cam 43 abuts the lower edge of the flexible sections 422 of the elastic plates 42 to deform the elastic plates 42 so that they will provide a balance torque. However, the arrangements and actuation relationships of other components in the embodiment are the same as the first embodiment mentioned above.

Referring to FIGS. 9 to 12, which are schematic diagrams showing a tilt stand 1000 according to the third embodiment of the present invention. The embodiment differs from the first embodiment in that the adjustment module 5 is absent in the embodiment and the configuration of the elastic module 4 is different. Specifically, the elastic module 4 in the embodiment includes a board element 44 which obtains stiffness and is used to replace the cam 43, and the curved surface 41 is disposed on the board element 44 to contact the elastic plates 42.

Moreover, the seat body 1 further comprises an extending portion 12 for the elastic plates 42 to be disposed. The extending portion 12 has a slot 121, and the inflexible sections 421 of the elastic plates 42 are disposed in the slot 121, wherein lengths of the elastic plates 42 in the slot 121 represents the lengths of the inflexible sections 421.

In the embodiment, the board element 44 is fixed on the tilting frame 3 so that the board element 44 can rotate synchronously with the tilting frame 3 about the axis X as a center. The board element 44 comprises a bonding area 441 and an arc bending area 442 that are integrally formed as a single structure, wherein the bonding area 441 is adjacent to the bearing plate 31, and the arc bending area 442 extends from the bonding area 441. The curved surface 41 is formed on the arc bending area 442. Moreover, the elastic plates 42 abut the arc bending area 442, the elastic plates 42 abut against the first abutting part 411 of the curved surface 41 when the tilting frame 3 is at the first position (see FIG. 11), and the elastic plates 42 abut against the second abutting part 412 of the curved surface 41 when the tilting frame 3 is at the second position (see FIG. 12).

Figure 13:
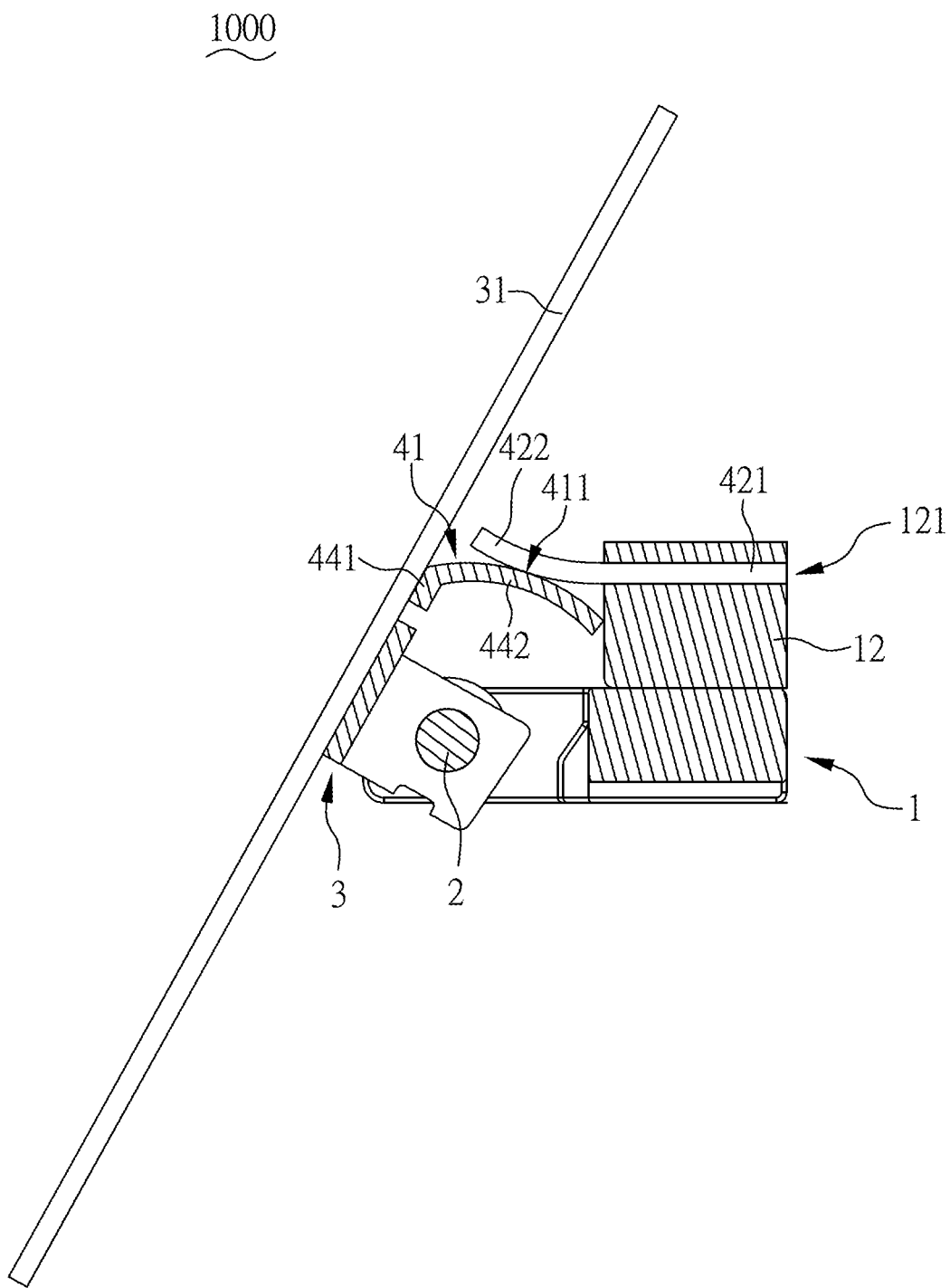
FIG. 13 is a cross-sectional view of a tilt stand in the first position according to the fourth embodiment of the present invention.
Figure 14:
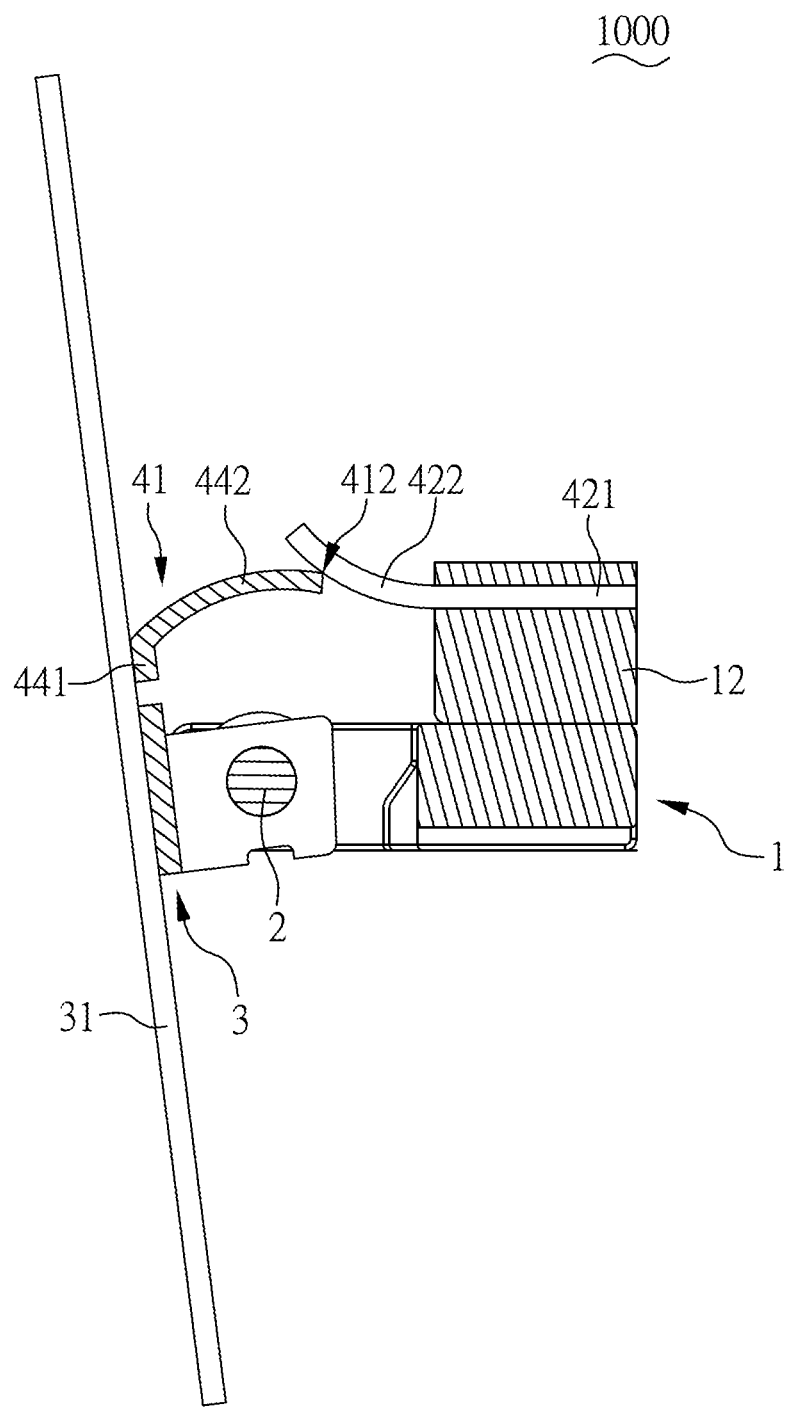
FIG. 14 is a cross-sectional view of a tilt stand in the second position according to the fourth embodiment of the present invention.
Figure 15:
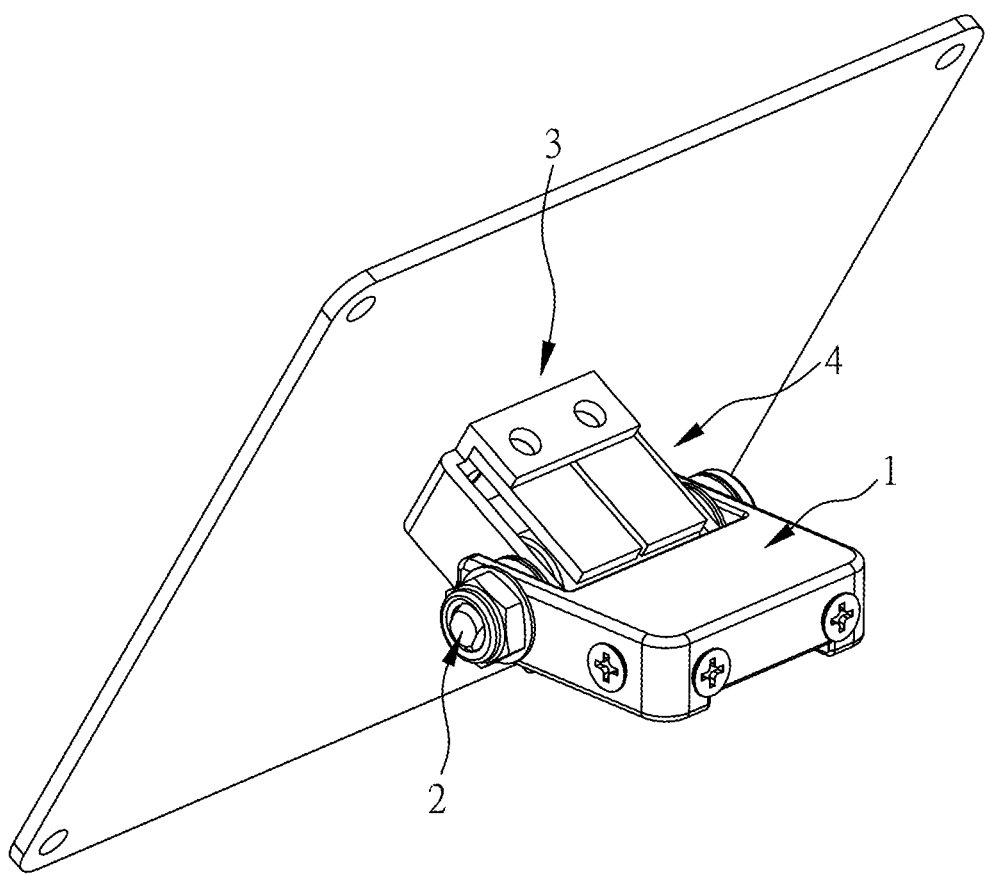
FIG. 15 is a schematic perspective view of a tilt stand according to the fifth embodiment of the present invention.
Figure 16:
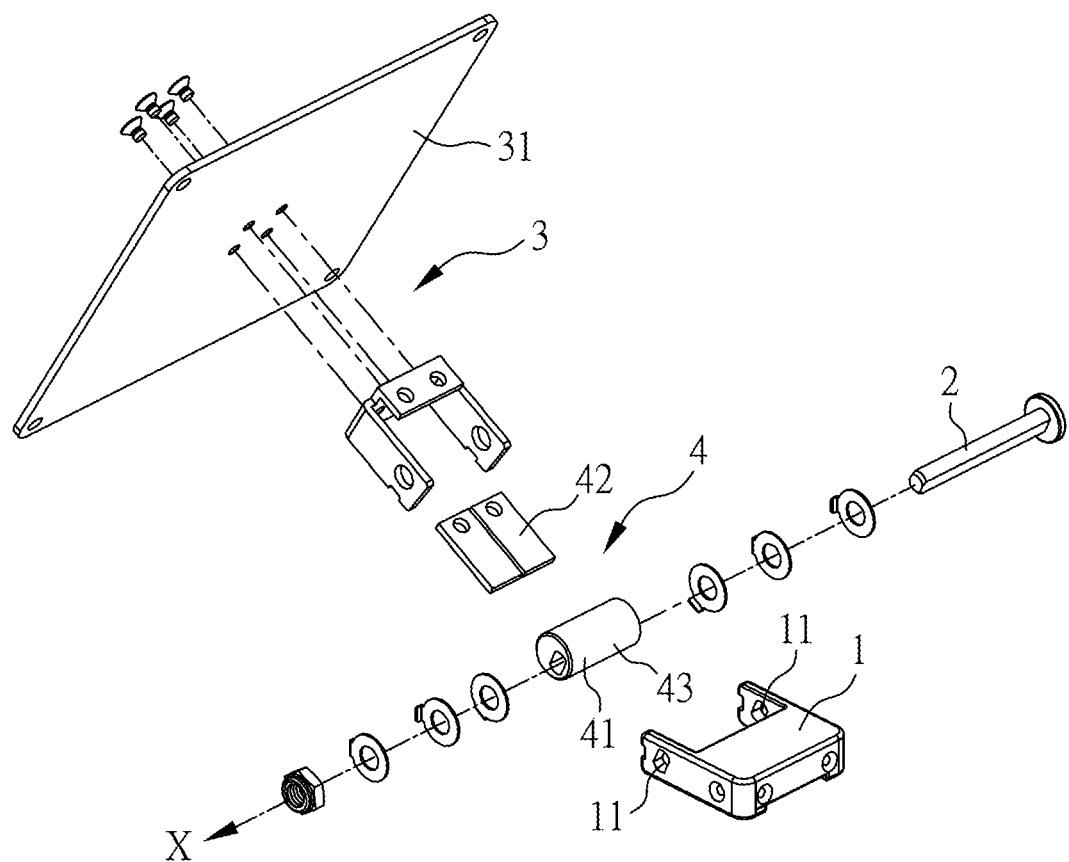
FIG. 16 is an exploded view of a tilt stand according to the fifth embodiment of the present invention.
Figure 17:
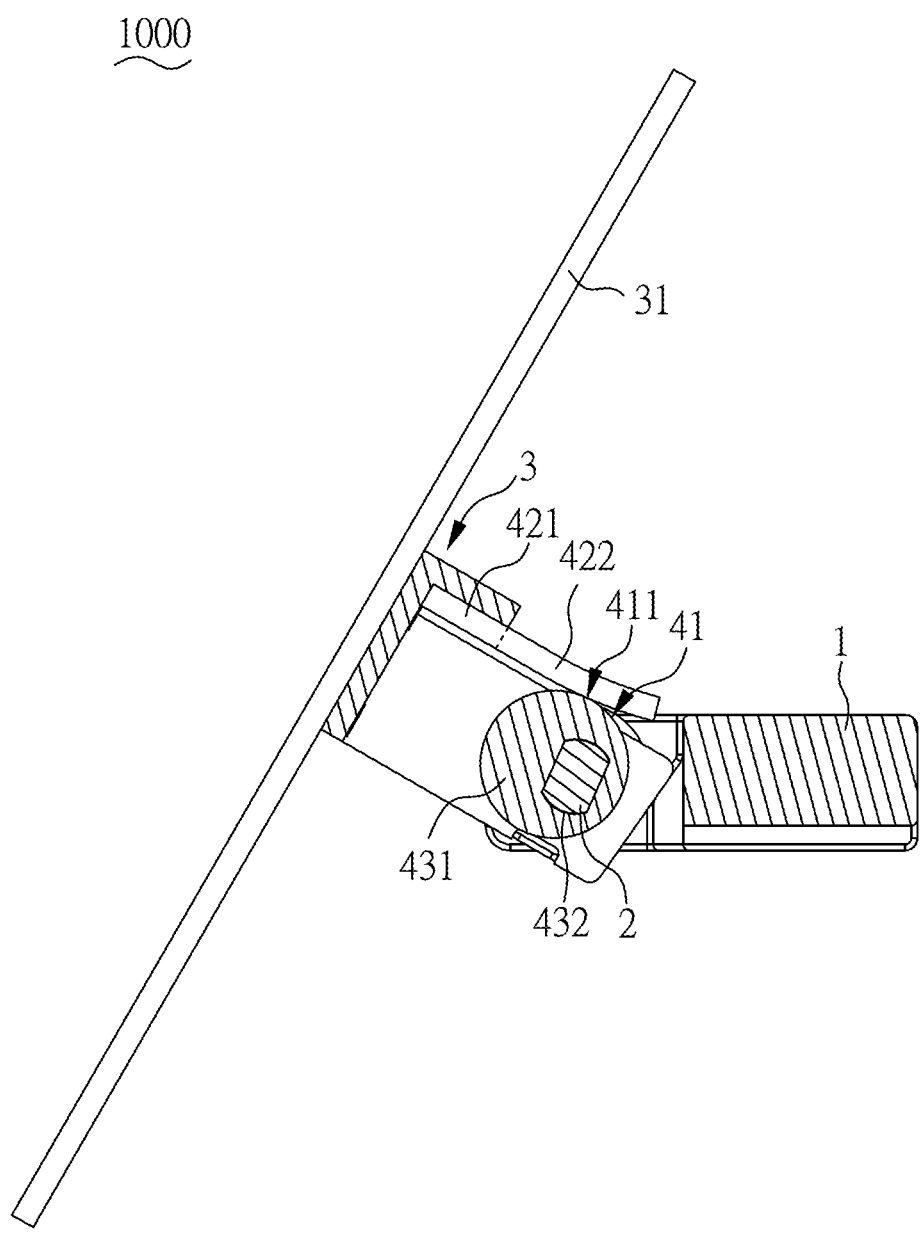
FIG. 17 is a cross-sectional view of a tilt stand in the first position according to the fifth embodiment of the present invention.
Figure 18:
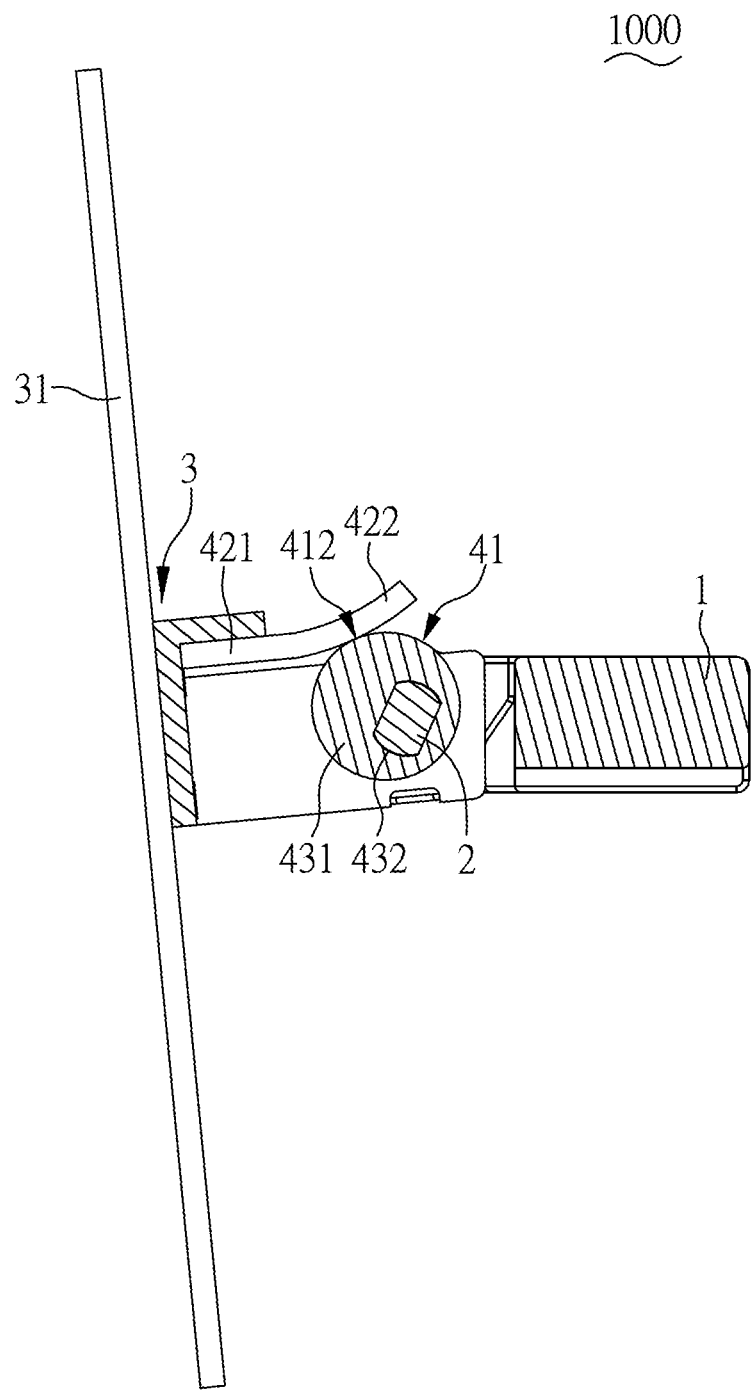
FIG. 18 is a cross-sectional view of a tilt stand in the second position according to the fifth embodiment of the present invention.

Referring to FIGS. 13 and 14, schematic diagrams of a tilt stand 1000 according to the fourth embodiment of the present invention are shown. The arrangements and actuation relationships of the embodiment are similar to the third embodiment, except for that the extending portion 12 of the embodiment is disposed at a position higher than the shaft 2. Hence, the elastic plates 42 and the board element 44 are correspondingly disposed at positions higher than the shaft 2. Namely, the arrangement of the elastic plates 42 and the board element 44 can be changed according to the requirements.

FIGS. 15 to 18 are a schematic perspective view and an exploded view of a tilt stand 1000 according to the fifth embodiment of the present invention. The embodiment differs from the first embodiment in that the adjustment module 5 is absent in the embodiment and the elastic plates 42 are fixed on the tilting frame 3.

In the embodiment, the elastic module 4 also includes a cam 43 sleeved on the shaft 2 and the curved surface 41 formed on the cam 43. The shaft 2 is fixed on the seat body 1. In detail, the shapes of the axial bores 11 of the seat body 1, the through hole 432 of the cam 43, and the cross-section of the shaft 2 are the same, and there is no fastening element 45 as described in the first embodiment to fix the cam 43 to the tilting frame 3. Namely, when the tilting frame 3 rotates relative to the seat body 1, the shaft 2 and the cam 43 are both remain freeze relative to the seat body 1. In contrast, the inflexible sections 421 of the elastic plates 42 are fixed on the tilting frame 3, and thus, in the embodiment, the elastic plates 42 are driven by rotating the tilting frame 3. As the tilting frame 3 is switched between the first position (see FIG. 17) and the second position (see FIG. 18), the elastic plates 42 move with the flexible section 422 abutting against the curved surface 41 between the first abutting part 411 and the second abutting part 412.

Figure 19:
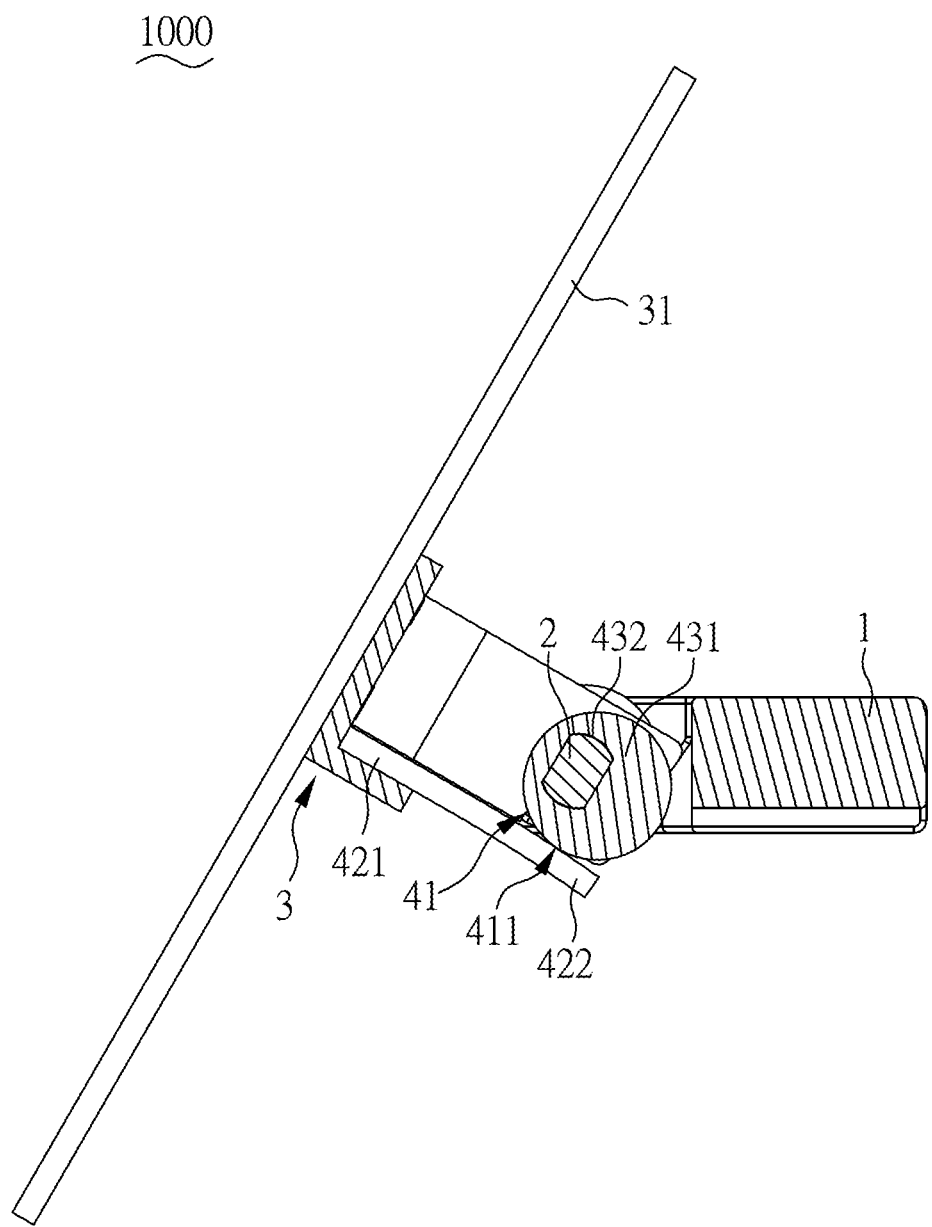
FIG. 19 is a cross-sectional view of a tilt stand according to the sixth embodiment of the present invention.

FIG. 19 is a schematic view of a tilt stand 1000 according to the sixth embodiment of the present invention. The embodiment differs from the fifth embodiment in that the elastic plates 42 of the embodiment are disposed at a lower position on the tilting frame 3. Therefore, the elastic plates 42 are against the cam 43 at the upper edge and an angle which the cam 43 fixed on is also differ from the fifth embodiment. Other arrangements and actuation relationships are generally similar to the fifth embodiment. Namely, the configuration of the elastic plates 42 can be adjusted according to the requirements.

In summary, by changing the positional relationship of the curved surface and the elastic plates, the deformation amounts will be corresponding changed. The changed deformation amounts thus generate the corresponding balance torque so that the display device can be stopped at any position between the first position and the second position. The tilt stands of the present invention are light and skinny. Furthermore, positions of the elastic module can be adjusted and changed freely according to the needs without any limitation as current hinges that adopt torsion springs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A tilt stand for bearing a display device, the tilt stand comprising:
   a seat body;
   a shaft penetrating through the seat body along an axis;
   a tilting frame connected to the display device, rotatably disposed on the shaft, and adapted to tilt between a first position and a second position; and
   an elastic module having a curved surface and at least one elastic plate, the elastic plate having an inflexible section and a flexible section connected to the inflexible section, wherein the inflexible section is fixed, and the flexible section abuts against the curved surface so that the elastic plate has a deformation amount for providing a balance torque to the curved surface;
   wherein the display device constantly provides a main torque to the shaft, and a direction of the balance torque is opposite to a direction of the main torque so that the balance torque is able to countervail the main torque;
   wherein when an external force is applied to the display device to adjust a tilt angle, the tilting frame rotates about the shaft, a positional relationship of the curved surface and the elastic plate is changed, and the deformation amount and the balance torque are changed, wherein when the display device and the tilting frame rotate from the first position to the second position, the main torque and the balance torque gradually increase, and when the display device and the tilting frame rotate from the second position to the first position, the main torque and the balance torque gradually decrease; and
   when the external force is removed, the tilting frame is stopped at once at a position between the first position and the second position.

2. The tilt stand as claimed in claim 1, wherein the curved surface has a first abutting part and a second abutting part, and a distance between the first abutting part and the axis is smaller than a distance between the second abutting part and the axis, and wherein the elastic plate abuts against the first abutting part of the curved surface when the tilting frame is at the first position, and the elastic plate abuts against the second abutting part of the curved surface when the tilting frame is at the second position.

3. The tilt stand as claimed in claim 2, wherein the elastic module further has a cam having the curved surface formed thereon, and the cam is sleeved on the shaft and connected to the tilting frame, and wherein the inflexible section of the elastic plate is fixed on the seat body, and the tilt stand further comprises an adjustment module, which is disposed on the seat body and movably presses against different positions of the elastic plate to change a length of the flexible section of the elastic plate.

4. The tilt stand as claimed in claim 3, wherein the adjustment module comprises a screw rod, a screw seat, and a pressing block, and wherein the screw seat and the pressing block are fixed to each other and are movably sleeved on the seat body, and the screw rod is screwed to the screw seat, and wherein the screw rod is rotatably disposed on the seat body but is not able to linearly move relative to the seat body.

5. The tilt stand as claimed in claim 4, wherein an extension direction of the screw rod is parallel to an extension direction of the inflexible section, and when the screw rod rotates on the seat body, the screw seat and the pressing block move relative to the seat body.

6. The tilt stand as claimed in claim 2, wherein the elastic module further has a board element being able to synchronously rotate with the tilting frame about the axis, and the curved surface is formed on the board element and the inflexible section of the elastic plate is disposed on the seat body.

7. The tilt stand as claimed in claim 6, wherein the seat body has an extending portion for the elastic plate to be disposed.

8. The tilt stand as claimed in claim 7, wherein the extending portion has a slot, and the inflexible section of the elastic plate is disposed in the slot.

9. The tilt stand as claimed in claim 2, wherein the elastic module further has a cam having the curved surface formed thereon, and the cam is sleeved on the shaft, wherein the shaft is fixed on the seat body, and the inflexible section of the elastic plate is fixed on the tilting frame.

10. The tilt stand as claimed in claim 3, wherein the cam is an eccentric cylinder and has a through hole for the shaft to pass through.

11. The tilt stand as claimed in claim 1, wherein the tilting frame has a bearing plate for connecting the display device.

12. The tilt stand as claimed in claim 1, wherein the elastic plate is a leaf spring and has a thickness between 2-10 millimeters.

* * * * *